Patented Feb. 9, 1937

2,070,258

UNITED STATES PATENT OFFICE 2,070,258

PRODUCTION OF TERTIARY BUTYL ALCOHOL

Gerald H. Coleman and Garnett V. Moore, Midland, Mich., assignors to The Dow Chemical Company, Midland, Mich., a corporation of Michigan No Drawing. Application April 18, 1934, Serial No. 721,155

6 Claims. (Cl. 260—156)

This invention concerns an improved method of producing tertiary butyl alcohol from isobutylene which is intermixed with other aliphatic hydrocarbons, particularly ethylene and/or secondary base olefines. By a "secondary base olefine" we mean an olefine which on hydration yields a secondary alcohol. Similarly, a "tertiary base olefine" is one which on hydration yields a tertiary alcohol.

Hydrocarbon mixtures containing isobutylene and other olefines, e. g. ethylene, propylene, normal butylenes, amylenes, etc., as well as corresponding saturated hydrocarbons, are produced when saturated aliphatic hydrocarbon mixtures which contain isobutane are heated to a suitable cracking temperature. It is known that tertiary butyl alcohol can be manufactured from such olefinic mixture by first removing amylenes and higher olefines therefrom, e. g. by fractional distillation under pressure, thereafter treating the residual gas mixture with sulphuric or hydrochloric acid of such concentration and at such temperature that isobutylene is selectively reacted therewith to form tertiary butyl sulphate or tertiary butyl chloride, respectively, and hydrolyzing the sulphate or chloride to obtain the tertiary butyl alcohol product. In preparing tertiary butyl alcohol by such method, however, careful control is required in order to avoid the production of alcohols from other olefines present, particularly propylene, and also to avoid polymerization of the isobutylene reactant into high boiling by-products. The method is also objectionable because of the quantity of acid consumed therein and the number of steps involved.

We have discovered that the isobutylene present in an olefinic mixture such as that described above can be hydrated selectively in the presence of a catalytic quantity of a strong acid to form tertiary butyl alcohol in good yield without side reactions occurring to appreciable extent. The invention, accordingly, consists in the method of producing tertiary butyl alcohol from hydrocarbon mixtures containing isobutylene hereinafter fully described and particularly pointed out in the claims.

The hydrocarbon mixture used as the starting material in preparing tertiary butyl alcohol by the present method, in addition to isobutylene, may contain ethylene or any secondary base olefine, e. g. propylene or normal butylenes, amylenes, hexylenes, etc., and also saturated hydrocarbons. It must, however, be substantially free of tertiary base olefines other than isobutylene, e. g. tertiary base amylenes, since such other tertiary base olefines may also be hydrated to the corresponding alcohols under the conditions herein described for the selective hydration of isobutylene.

Such hydrocarbon mixture may be obtained from a variety of sources. For instance, when isobutyl chloride is hydrolyzed with an aqueous alkali, a mixture of isobutylene and normal butylenes is obtained, which can be used as the starting material in our process. However, the olefinic hydrocarbon mixture employed in our process is usually obtained by heating a hydrocarbon fraction which contains isobutane to a temperature at which cracking occurs. The cracked gases usually consist of a mixture of methane and its homologues and ethylene and its homologues, including of course isobutylene. When such gases contain tertiary base olefines other than isobutylene, for instance tertiary base amylenes, it is necessary that such other tertiary base olefines be removed before hydrating the isobutylene. This is ordinarily done by condensing the hydrocarbon mixture under pressure to the liquid state and fractionally distilling the mixture under pressure to obtain a low boiling fraction which contains butylenes and lower olefines but which is substantially free of higher olefines. The isobutylene contained in such low boiling fraction can selectively be hydrated to form pure tertiary butyl alcohol by our method.

We prepare tetiary butyl alcohol from a hydrocarbon mixture such as that described above by heating the same under pressure with water, in the presence of a strong acid, i. e. an acid having an ionization constant greater than $1 \times 10^{-3}$ and preferably greater than $1.7 \times 10^{-2}$ at 25° C., to a reaction temperature below 200° C., preferably between 75° and 150° C., the mixture preferably being agitated during said operation. Among the various strong acids which may be employed to catalyze the reaction are hydrochloric, sulphuric, sulphurous, nitric, chromic, oxalic, and benzenesulphonic acids. When the reaction is carried out above 200° C., the conversion of isobutylene to tertiary butyl alcohol is usually incomplete and other olefines which may be present, particularly propylene, are sometimes hydrated to the corresponding alcohols with the result that the tertiary butyl alcohol product is contaminated with other alcohols.

The water may be employed in any desired proportion, but preferably in a proportion representing more than 4 times the molecular equivalent of the isobutylene present. In general, the reaction proceeds more rapidly as the molecular ratio of water to isobutylene is increased to about 76, but at higher ratios the further addition of water does not increase the speed of reaction to an appreciable extent. The acid catalyst is used in the proportion necessary to form, with the water present, an aqueous acid solution having a strength less than 2 normal, preferably between 0.02 and 1 normal, since side reactions sometimes occur to an objectionable extent when the acid is used in higher concentration. The acid may be added, as such, to the reaction mixture or it may be formed within said mixture from a salt, e. g. stannic chloride, ferric chloride, aluminum chloride, antimony trichloride, sodium acid sulphate, etc., which is hydrolyzed by water to form a strong acid.

The reaction usually is substantially complete after from 1 to 3 hours of heating under the reaction conditions described above, but longer heating may sometimes be required, particularly when the molecular ratio of water to isobutylene in the initial mixture is low, e. g. below 4. The completeness of reaction can be determined at any time by withdrawing a measured sample of gas from the reactor and shaking the sample at room temperature with a 60 per cent sulphuric acid solution. If an appreciable portion of the gas is quickly absorbed by the acid, the reaction mixture contains unreacted isobutylene.

After the reaction is complete, unreacted gases are released from the reactor, and the reaction liquor is fractionally distilled to separate the tertiary butyl alcohol product, usually as a relatively concentrated aqueous solution thereof. For complete recovery of the alcohol, the fraction distilling between 70° and 99° C. at atmospheric pressure is collected, but the major portion of the aqueous alcohol distills between 75° and 80° C. The aqueous tertiary butyl alcohol may be dehydrated by usual procedure, e. g. by redistillation in the presence of calcium oxide, to obtain substantially pure anhydrous tertiary butyl alcohol.

The following examples illustrate certain ways in which the principle of our invention has been applied, but are not to be construed as limiting the invention.

*Example 1*

An aqueous sulphuric acid solution, containing 0.045 mole of sulphuric acid and 20 moles of water, was placed in a bomb. A gaseous hydrocarbon mixture, consisting of 81.9 per cent isobutylene, 14.7 per cent normal butylenes, and 3.4 per cent inert gases (largely isobutane), by volume, was then charged under pressure into the bomb until the latter contained 0.957 mole of isobutylene. The charged bomb was closed and heated at 100° C., with agitation, for 2 hours. It was then cooled, unreacted gases were released therefrom, and the reaction liquor was removed and fractionally distilled. The alcoholic fraction of the distillate was analyzed and found to contain approximately 0.957 mole of tertiary butyl alcohol and to be free of other alcohols. Accordingly, the conversion of isobutylene to tertiary butyl alcohol was practically quantitative and was unaccompanied by side reactions.

*Example 2*

A hydrocarbon mixture consisting of 0.397 mole of isobutylene, 0.079 mole of normal butylenes, and 0.322 mole of ethylene was heated with an aqueous sulphuric acid solution, containing 0.03 mole of sulphuric acid and 15 moles of water, under pressure at 100° C. for 2 hours. The reactor was agitated during the heating operation. The alcohol product was then separated by procedure similar to that described in Example 1. There was obtained 0.344 mole of aqueous tertiary butyl alcohol. The latter was uncontaminated with other alcohols.

*Example 3*

A mixture of 0.390 mole isobutylene, 0.076 mole normal butylenes, and 0.345 mole propylene was heated under pressure at 100° C. for 2 hours with an aqueous sulphuric acid solution containing 0.03 mole sulphuric acid and 15 moles water. By procedure similar to that described in Example 1, 0.280 mole of aqueous tertiary butyl alcohol was separated from the reacted mixture. The tertiary butyl alcohol product was uncontaminated with other alcohols.

*Example 4*

A mixture of 3.27 moles of isobutylene, 0.637 mole of normal butylenes, 5.76 moles of propylene and 8.93 moles of ethylene was heated under pressure, at 100° C. for 5 hours with an aqueous sulphuric acid solution containing 0.443 mole of sulphuric acid and 100 moles of water. The mixture was agitated during said heating operation. The alcohol product was then separated as described in Example 1. There was obtained 1.572 moles of pure aqueous tertiary butyl alcohol.

Although, in each of the foregoing examples, sulphuric acid was employed as the acid catalyst, we have also successfully used hydrochloric, nitric, chromic, phosphoric, oxalic, and benzene-sulphonic acids as catalysts for the selective hydration of isobutylene by our method. Insofar as we are aware, any strong acid can be used to catalyze the hydration.

Although the hydrocarbon mixtures employed in the foregoing examples were free of olefines higher than butylene, the invention is not restricted to the employment of such mixtures, since substantially pure tertiary butyl alcohol can also be prepared by our method from admixtures of isobutylene with higher secondary base olefines, e. g. the secondary base amylenes, hexylenes, etc. It is necessary, however, that the mixture be substantially free of tertiary base olefines other than isobutylene.

In preparing tertiary butyl alcohol by our method, substantially inert organic solvents, e. g. liquid paraffin hydrocarbons, aromatic solvents such as benzene, toluene, chlorobenzene, etc., may be added to the initial reaction mixture to aid in dissolving the isobutylene reactant. However, by agitating the mixture during reaction, the hydration can be carried out smoothly and rapidly in the absence of such solvent.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:—

1. The method of making tertiary butyl alcohol which comprises heating a hydrocarbon mixture containing isobutylene but substantially free of other tertiary base olefines with a less than 2 normal aqueous solution of a mineral acid under pressure to a reaction temperature below 200° C.

in the substantial absence of salts of metals selected from the class consisting of bismuth and the heavy metals of the first group of the periodic system.

2. In a method for producing tertiary butyl alcohol from a hydrocarbon mixture which contains isobutylene and another olefine selected from the class consisting of ethylene and secondary base olefines, but which is substantially free of tertiary base olefines other than isobutylene, the step which consists in heating said hydrocarbon mixture with a less than 2 normal aqueous solution of a strong acid, under pressure, to a reaction temperature between about 75° and about 150° C. in the substantial absence of salts of metals selected from the class consisting of bismuth, copper, and silver.

3. In a method for producing tertiary butyl alcohol from a hydrocarbon mixture which contains isobutylene and another olefine selected from the class consisting of ethylene and secondary base olefines, but which is substantially free of tertiary base olefines other than isobutylene, the step which consists in heating said hydrocarbon mixture with water in the presence of a strong acid but in the substantial absence of salts of metals selected from the class consisting of bismuth, copper, and silver, under pressure, to a reaction temperature between about 75° and about 150° C., the water being employed in amount representing at least 4 times the molecular equivalent of the isobutylene present, and the acid being present in the proportion necessary to form, with the water, a between about 0.02 and about 2 normal aqueous acid solution.

4. In a method for producing tertiary butyl alcohol from a hydrocarbon mixture containing isobutylene and another olefine having not more than 4 carbon atoms to the molecule, but which is substantially free of higher olefines, the steps which consist in heating said hydrocarbon mixture under pressure to a reaction temperature between about 75° and about 150° C. in the substantial absence of salts of metals selected from the class consisting of bismuth, copper and silver with a between about 0.02 and about 2 normal aqueous solution of a strong acid, which aqueous solution contains water in amount representing at least 4 times the molecular equivalent of the isobutylene present, whereby the isobutylene is selectively hydrated to form tertiary butyl alcohol, and fractionally distilling the reacted liquor to separate the tertiary butyl alcohol product as a relatively concentrated aqueous solution thereof.

5. In a method for producing tertiary butyl alcohol from a hydrocarbon mixture which contains isobutylene and another olefine selected from the class consisting of ethylene and secondary base olefines, but which is substantially free of tertiary base olefines other than isobutylene, the step which consists in heating, under pressure to a reaction temperature between about 75° and about 150° C. and in the substantial absence of salts of metals selected from the class consisting of bismuth, copper, and silver, said hydrocarbon mixture with a less than 2 normal aqueous solution of an acid having an ionization constant greater than $1.7 \times 10^{-2}$ at 25° C.

6. In a method of making tertiary butyl alcohol, the step which consists in heating isobutylene with a less than 2 normal aqueous solution of a mineral acid under pressure to a reaction temperature below 200° C. in the substantial absence of a salt of a metal selected from the class consisting of bismuth and the heavy metals of the first group of the periodic system.

GERALD H. COLEMAN.
GARNETT V. MOORE.